United States Patent
Nemavat (10) Patent No.: US 10,750,376 B2
(45) Date of Patent: Aug. 18, 2020

(54) TOPOLOGY SCANNING IN A MULTI-HOP WIRELESS NETWORK

(71) Applicant: Facebook, Inc., Menlo Park, CA (US)

(72) Inventor: Pradeep Jugraj Nemavat, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 36 days.

(21) Appl. No.: 16/237,023

(22) Filed: Dec. 31, 2018

(65) Prior Publication Data

US 2020/0213867 A1  Jul. 2, 2020

(51) Int. Cl.
| | |
|---|---|
| *H04W 56/00* | (2009.01) |
| *H04W 16/28* | (2009.01) |
| *H04W 72/04* | (2009.01) |
| *H04W 80/02* | (2009.01) |
| *H04W 4/02* | (2018.01) |

(52) U.S. Cl.
CPC ........... *H04W 16/28* (2013.01); *H04W 4/025* (2013.01); *H04W 72/046* (2013.01); *H04W 72/0446* (2013.01); *H04W 80/02* (2013.01)

(58) Field of Classification Search
CPC . H04W 16/28; H04W 4/025; H04W 72/0446; H04W 72/046; H04W 80/02
USPC .......................................................... 370/329
See application file for complete search history.

(56) References Cited

U.S. PATENT DOCUMENTS

| | | | | |
|---|---|---|---|---|
| 2015/0382171 | A1* | 12/2015 | Roy ...................... | H04W 48/16 370/329 |
| 2019/0007997 | A1* | 1/2019 | Shiotani ............ | H04W 72/0406 |
| 2019/0053133 | A1* | 2/2019 | Abouelseoud ...... | H04W 40/244 |
| 2019/0364492 | A1* | 11/2019 | Azizi .................... | H04W 4/029 |

FOREIGN PATENT DOCUMENTS

| | | |
|---|---|---|
| WO | WO 2014124048 A1 | 8/2014 |
| WO | WO 2015134746 A1 | 9/2015 |
| WO | WO 2018112712 A1 | 6/2018 |

OTHER PUBLICATIONS

International Search Report and Written Opinion for International Application No. PCT/US2019/067768 dated Mar. 24, 2020.

* cited by examiner

*Primary Examiner* — Sai Ming Chan
(74) *Attorney, Agent, or Firm* — Baker Botts L.L.P.

(57) ABSTRACT

In one embodiment, a method includes, by first network node of a multi-hop wireless network, transmitting one or more scan-request messages during a topology scanning, where the topology scanning is performed for a predetermined number of scan cycles, and where the first network node is connected to a central controller of the multi-hop wireless network, receiving a scan-response message sent using a transmission beam j by a second network node, where the second network node is unconnected to the central controller, storing information associated with the second network node, where the information comprises an indication that beam i is a beam for communications at the first network node, an indication that beam j is a beam for communications at the second network node, an identifier for the second network node, and the geo-location information associated with the second network node, and sending a network-ignition-request message to the second network node.

20 Claims, 5 Drawing Sheets

TOPOLOGY SCANNING IN A MULTI-HOP WIRELESS NETWORK

TECHNICAL FIELD

This disclosure generally relates to wireless communication networks.

BACKGROUND

A multi-hop wireless network may facilitate the communication of data where wired communication is unavailable, impractical, or impossible. For example, a multi-hop wireless network may serve as a wireless backhaul network connecting a core or backbone network to one or more customer networks. A customer network may include customer equipment (CE)—such as Wi-Fi access points (APs), cellular base stations (such as femtocells), and related equipment or other CE—providing wireless or wired connectivity to one or more client devices. A client device may be a desktop or laptop computer, tablet, mobile telephone, appliance, or other client device.

A multi-hop wireless network may include multiple wirelessly interconnected network nodes. A wireless connection between two network nodes may be a hop, and data may be communicated wirelessly through the network from one edge to another along one or more network paths traversing series of network nodes and hops. All or some of the network nodes may be at fixed locations. For example, all or some of the network nodes may be affixed to street lamps, utility poles, other street furniture, or building exteriors. All or some of the network nodes may act as distribution nodes (DNs) or customer nodes (CNs). A DN may wirelessly communicate with CNs or other DNs to relay data through the network. One or more DNs may also communicate with one or more edge devices of a core or backbone network to connect the multi-hop wireless network to the core or backbone network. A CN may communicate with DNs and CEs to connect a customer network to the multi-hop wireless network.

SUMMARY OF PARTICULAR EMBODIMENTS

In particular embodiments, a network node of a multi-hop wireless network may broadcast a beamforming scan to determine topology information of deployed network nodes in the multi-hop wireless network before igniting the deployed network nodes. The network node may comprise a plurality of arrays of beamforming antennae that may be each operable to support a wireless connection between the network node and another network node of the multi-hop wireless network. A network node may need to be ignited. Ignition for a particular network node may occur when an antenna array of the particular network node establishes a wireless connection with another antenna array of a different network node. In particular embodiments, network ignition may require information and data including settings regarding beamforming weights for one or more antenna arrays in each of the network nodes. The information and data may also include Global Positioning System (GPS) data, orientations of the network nodes and other information that may be useful in igniting the nodes. Collecting such information and data without errors may be an expensive operation because collecting such information and data may require human effort. The network may determine such information and data by having a scanning phase before the igniting phase.

When a network node of the multi-hop wireless network is powered on, the network node may acquire location, frequency, and timing and phase sync information from a global positioning system (GPS) module connected to the network node. The network node may determine whether the network node has a connection to a central controller of the multi-hop wireless network through an in-band link. In response to the determination, the network node may wait to be configured by the central controller as an "initiator" or a "responder" in the ignition procedure. If the network node does not have a connection to the central controller, the network node may automatically configure itself as a responder. A network node may begin a broadcast beamforming topology scanning when the network node is configured as an initiator by the central controller. In particular embodiments, the network node may begin the broadcast beamforming topology scanning on receiving an explicit triggering message from the central controller.

An initiator network node may perform a topology scanning for a predetermined number (e.g., 4) of scan cycles to resolve message collisions and/or interferences. A scan cycle may comprise n beamforming windows, where n may correspond to a predefined number of beams (e.g., 31). Each beam may correspond to a predetermined configuration of beamforming weights of an array of beamforming antennae. A beamforming window may comprise n beamforming frames. Each beamforming frame may comprise a plurality of transmission slots and a plurality of reception slots. In i-th beamforming window of a cycle, the initiator network node may broadcast a scan-request message using transmission beam i at each beamforming frame j, where $j=\{0, \ldots, n-1\}$. The destination address of the scan-request message may be set to the broadcast address. On receiving the scan-request message at j-th beamforming frame of the i-th beamforming window of a cycle, a responder network node, not having a connection to the central controller, may prepare a scan-response message comprising a media access control (MAC) address of the responder network node, GPS location information acquired from the connected GPS module, and a list of addresses for one or more collocated (or, wired connected) network nodes in a site. When the responder network node receives the scan-request messages at more than one beamforming frames in the beamforming window i, the responder network node may choose a beamforming frame j with a highest reception signal strength. The responder network node may send the prepared scan-response message back to the initiator network node in a beamforming window i+N, where N is a predetermined constant number. The responder network node may transmit the scan-response message using transmission beam j at a randomly selected beamforming frame k of beamforming window i+N. The responder network node may select the beamforming frame k for the transmission randomly to reduce a possibility of collisions with any other potentially existing responder network nodes.

When the initiator network node successfully receives the scan-response message from the responder network node at the beamforming frame k of the beamforming window i+N, the initiator network node may prepare an acknowledgement message and transmits the acknowledgement message using the transmission beam i. Once a scan-response message for a scan-request message is successfully acknowledged, the responder network node may not respond to any scan-request message from the initiator network node in beamforming window i of any following cycles to reduce changes of collisions. At the end of scanning procedure, the initiator network node may ignite the scanned responder network nodes. After being ignited, a responder network node may become an initiator network node and perform a broadcast beamforming scan to scan network nodes that have not been scanned yet.

A first network node of a multi-hop wireless network may transmit one or more scan-request messages during a topology scanning, where the topology scanning is performed for a predetermined number of scan cycles, where each scan cycle comprises n beamforming windows, where n corresponds to a predefined number of beams, where each beam corresponds to a predetermined configuration of beamforming weights of an array of beamforming antennae, where the first network node is connected to a central controller of the multi-hop wireless network, where the one or more scan-request messages are transmitted using a transmission beam i, and where each of the one or more scan-request messages comprises a broadcast address as a scan-request destination address and a first identifier identifying the first network node as a scan-request source address. The first network node may receive a scan-response message sent using a transmission beam j by a second network node, where the second network node is unconnected to the central controller, and where the scan-response message comprises the first identifier as a scan-response destination address, a second identifier identifying the second network node as a scan-response source address, geo-location information associated with the second network node, and one or more identifiers of one or more network nodes collocated with the second network node. The first network node may store information associated with the second network node, where the information comprises an indication that beam i is a beam for communications at the first network node, an indication that beam j is a beam for communications at the second network node, the second identifier, the geo-location information associated with the second network node, and the identifiers of the network nodes collocated with the second network node. The first network node may send a network-ignition-request message to the second network node.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
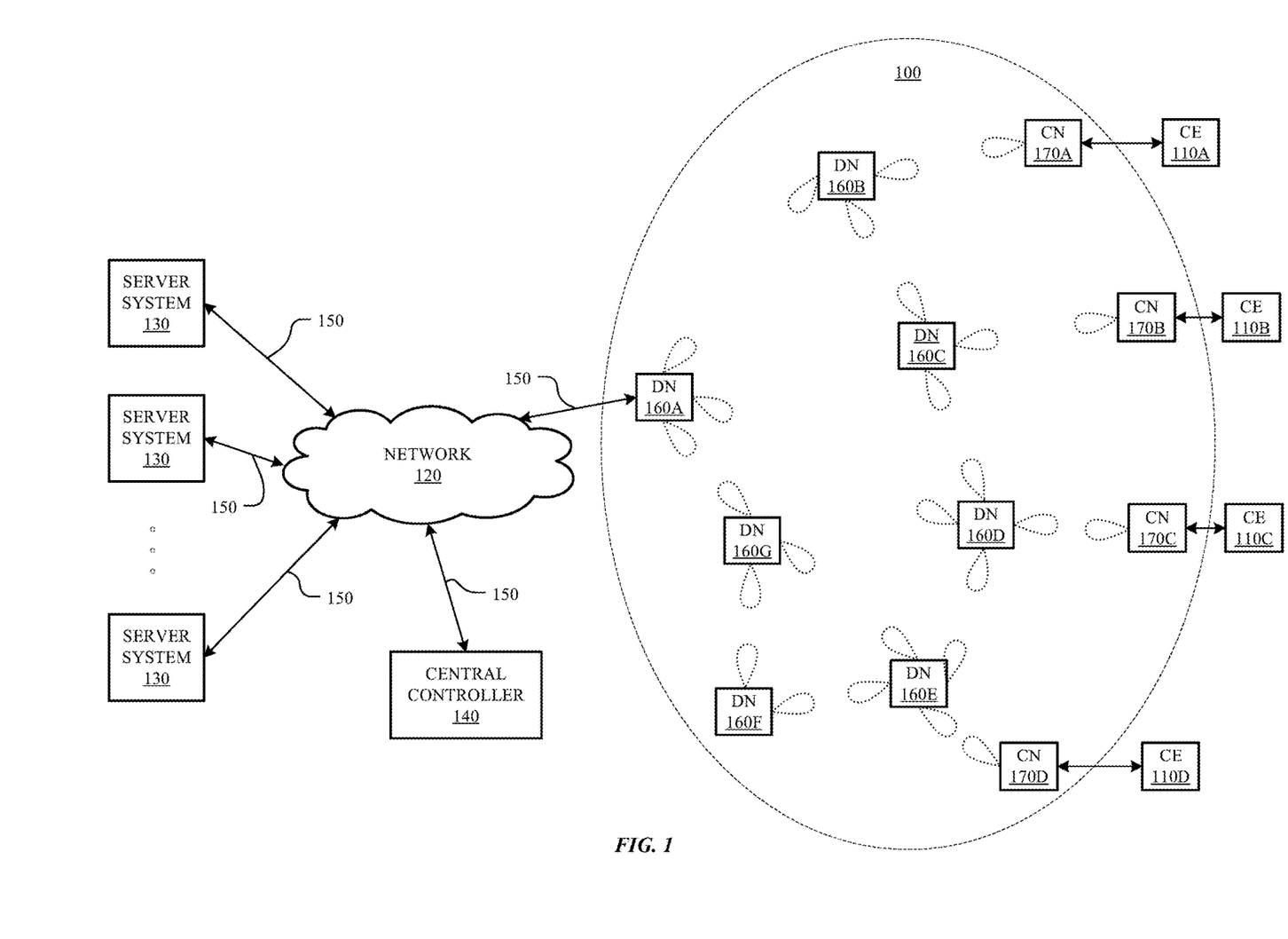
FIG. 1 illustrates an example multi-hop wireless network.

FIG. 1 illustrates an example multi-hop wireless network 100. In the example of FIG. 1, multi-hop wireless network 100 connects CEs 110A-110D at customer premises (such as residences or places of businesses) to a core or backbone network 120 (which may include one or more portions of the Internet). Network 120 connects multi-hop wireless network 100 to one or more server systems 130. Network 120 may also connect central controller 140 to multi-hop wireless network 100. As described below, a connection between central controller 140 and a network node of multi-hop wireless network 100 may be an in-band connection or out-of-band connection. Links 150 may connect multi-hop wireless network 100, server systems 130, and central controller 140 to CEs 110A-110D. This disclosure contemplates any suitable links 150 for these connections. For example, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links, where appropriate. In particular embodiments, one or more links 150 may each include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the PSTN, a 2G, 3G, or 4G mobile-telecommunications network, a satellite communications network, another link 150, or a combination of two or more such links 150, where appropriate. Links 150 are not necessarily the same throughout the network environment of FIG. 1. One link 150 may differ from another in one or more respects. Although the example of FIG. 1 is described and illustrated with a particular network environment including a particular number of particular systems and components arranged in a particular manner, this disclosure contemplates any suitable network environment including any suitable number of any suitable systems and components arranged in any suitable manner. For example, two or more of multi-hop wireless network 100, server systems 130, or central controller 140 may be connected to each other directly, bypassing network 120. As another example, two or more of multi-hop wireless network 100, server systems 130, or central controller 140 may be physically or logically co-located with each other in whole or in part.

A connection between central controller 140 and a network node of multi-hop wireless network 100 may be an in-band connection or out-of-band connection. An in-band connection between central controller 140 and a network node of multi-hop wireless network 100 is a connection that traverses network 120 and wireless network 100. An out-of-band connection between central controller 140 and a network node of multi-hop wireless network 100 is a connection that bypasses in whole or in part network 120 or multi-hop wireless network 100. For example, in FIG. 1, an in-band connection between central controller 140 and CN 170A may traverse the following: (1) link 150 between central controller 140 and network 120; (2) network 120; (3) link 150 between network 120 and DN 160A; (4) DN 160A; (5) a direct wireless connection between DN 160A and DN 160B; (5) DN 160B; and (6) a direct wireless connection between DN 160B and CN 170A. An out-of-band connection between central controller 140 and CN 170A may include one or more wireless connections between them through one or more portions of a 2G, 3G, or 4G mobile telecommunications network, bypassing one or more of the following: (1) link 150 between central controller 140 and network 120; (2) network 120; (3) link 150 between network 120 and DN 160A; or (4) multi-hop wireless network 100. Although this disclosure describes particular in-band connections, this disclosure contemplates any suitable in-band connections. Similarly, although this disclosure describes particular out-of-band connections, this disclosure contemplates any suitable out-of-band connections.

A server system 130 may provide services (such as web services) to client and other devices and systems. For example, a server system 130 may include one or more web servers, news servers, mail servers, message servers, advertising servers, file servers, application servers, exchange servers, database servers, proxy servers, other suitable servers, or a suitable combination thereof. A server system 130 may include hardware, software, or embedded logic components or a combination of two or more such components for carrying out the functions implemented or supported by server system 130. In addition, a server system 130 may include one or more servers and be a unitary server system or a distributed server system spanning multiple computer systems or multiple datacenters. Although this disclosure describes and illustrates particular server systems, this disclosure contemplates any suitable server systems.

Central controller 140 may act as a central controller for multi-hop wireless network 100, which may include coordinating topology scanning and ignition of DNs 160 and CNs 170, as described below. Central controller 140 may include hardware, software, or embedded logic components or a combination of two or more such components for carrying out its functions. In addition, central controller 140 may include one or more servers and be a unitary computer system or a distributed computer system spanning multiple computer systems or multiple datacenters. Central controller 140 may be connected to multi-hop wireless network 100 by network 120. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Although this disclosure describes and illustrates a particular central controller 140, this disclosure contemplates any suitable central controller 140.

In the example of FIG. 1, multi-hop wireless network 100 includes multiple DNs 160 and CNs 170. A DN 160 wirelessly communicates with one or more CNs 170 or one or more other DNs 160 to relay data through multi-hop wireless network 100. DN 160A also communicates through a link 150 with one or more edge devices of network 120 to connect multi-hop wireless network 100 to network 120, providing a point-of-presence (PoP) for multi-hop wireless network 100 on network 120. A CN 170 communicates with one or more DNs 160 and one or more CEs 110 to connect a customer network to the multi-hop wireless network. One or more wireline or other suitable links may connect a CN 170 to a CE 110. A CE 110 may be part of a customer network located for example at a customer premises and may include one or more Wi-Fi APs, cellular base stations (such as femtocells), and related equipment or other CEs providing wireless or wired connectivity to one or more client devices. A client device may be an electronic device including hardware, software, or embedded logic components or a combination of two or more such components designed to carry out particular functions implemented or supported by the client device. For example, a client device may be a desktop or laptop computer, tablet, e-book reader, GPS device, camera, mobile telephone, appliance, augmented-reality or virtual-reality device, another suitable client device, or a suitable combination thereof. This disclosure contemplates any suitable client devices.

As described above, multi-hop wireless network 100 includes multiple DNs 160 and CNs 170. Wireless communication in multi-hop wireless network 100 may be point-to-point, and DNs 160 and CNs 170 may communicate wirelessly with each other in one or more frequency bands at or around 60 GHz. A DN 160 or CN 170 may have a maximum range of approximately 1.5 kilometers, but may typically communicate with other DNs 160 or CNs within approximately 200-300 meters. All or some of DNs 160 and CNs 170 the network nodes may be at fixed locations. For example, all or some of DNs 160 and CNs 170 may be affixed to street lamps, utility poles, other street furniture, or building exteriors.

A network node of multi-hop wireless network 100 may include one or more antenna arrays that are each capable of beamforming to direct signal transmission or reception by network node. A single antenna array capable of beamforming may be referred to as a sector. If a network node has multiple sectors, they will likely face different directions. For example, a network node affixed to a street pole could have four separate antenna arrays on it, with one facing north, one facing east, one facing south, and one facing west. To aim a sector for transmission or reception, the beamforming weight of the antenna array constituting the sector may be adjusted. A micro-route is a gross reflection or line of site between two sectors. A nano-route is a fine reflection or line of site between two sectors. Typically, a micro-route between two sectors has several possible nano-routes. Some of those nano-routes will provide better link capacity between the two sectors, and some of those nano-routes will interfere more with neighboring nodes. In the example of FIG. 1, the directions of the sectors of DNs 160 and CNs 170 for transmission and reception are shown as lobes with dashed lines. Each of these lobes represents a sector's main lobe (e.g. the direction of the greatest transmission power or reception sensitivity). A sector may also have side lobes and nulls, which are not shown in FIG. 1. In the example of FIG. 1, DN 160A has sectors aimed at DN 160B, DN 160D, and DN 160G; DN 160B has sectors aimed at DN 160A, DN 160C, and CN 170A; DN 160C has sectors aimed at DN 160B, DN 160D, and CN 170B; DN 160D has sectors aimed at DN 160A, DN 160C, DN 160E, and CN 170C; DN 160E has sectors aimed at DN 160D, DN 160F, DN 160G, and CN 170D; DN 160F has sectors aimed at DN 160E and DN 160G; DN 160G has sectors aimed at DN 160A, DN 160E, and DN 160F; CN 170A has a sector aimed at DN 160B; CN 170B has a sector aimed at DN 160C; CN 170C has a sector aimed at DN 160D; and CN 170D has a sector aimed at DN 160E. As described below, the sectors of DNs 160 and CNs 170 may be dynamically re-directed by changing the beamforming weights of the respective antenna arrays. Moreover, as further described below, the sectors of particular DNs 160 and CNs 170 may be dynamically re-directed in response to particular events. Although this disclosure describes and illustrates a particular example multi-hop wireless network with a particular number of particular network nodes in a particular arrangement with particular numbers of particular beamforming antenna arrays aimed in particular directions, this disclosure contemplates any suitable multi-hop wireless network with any suitable number of any suitable network nodes in any suitable arrangement with any suitable numbers of any suitable beamforming antenna arrays aimed in any suitable directions.

Figure 2:
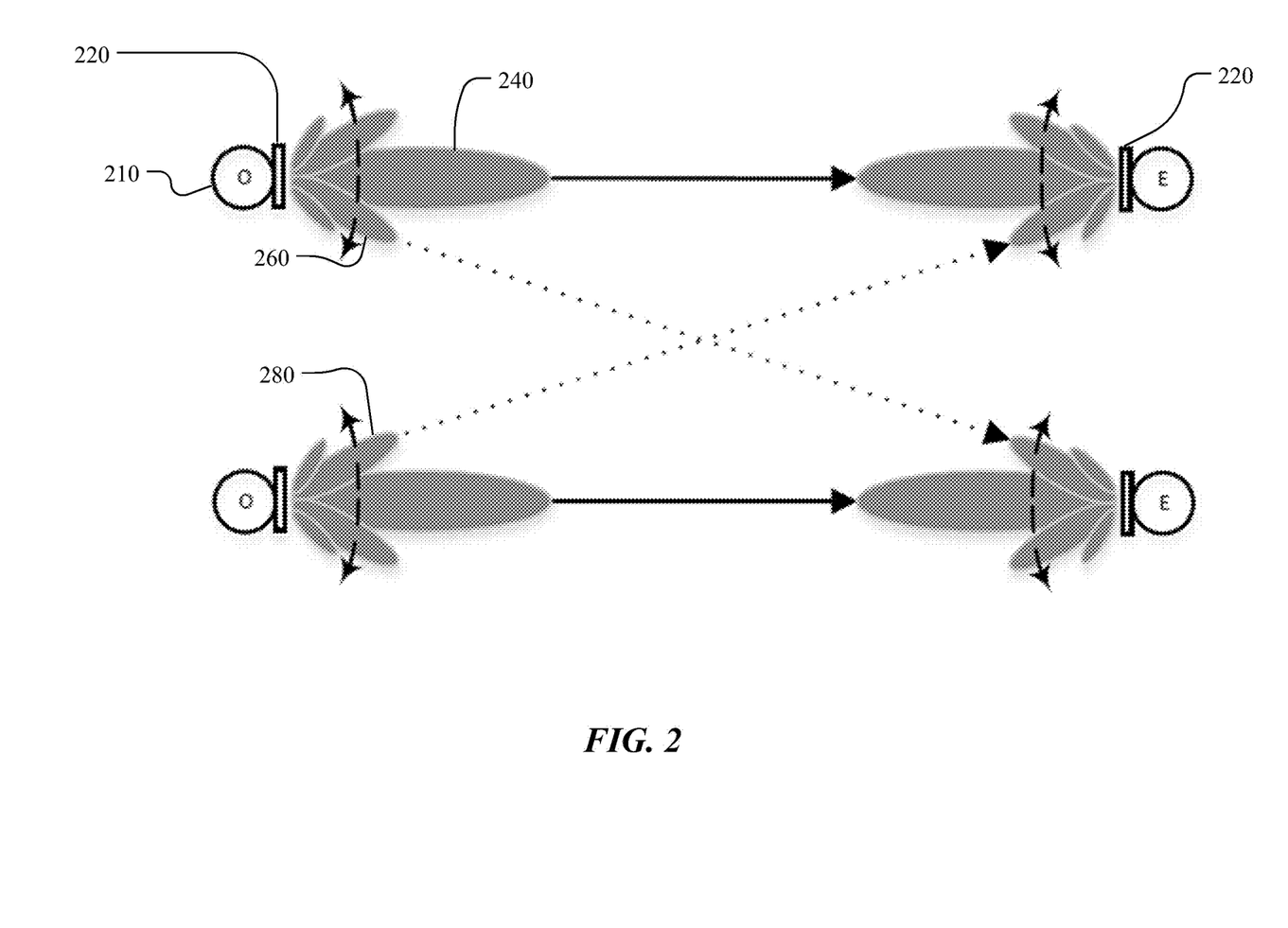
FIG. 2 illustrates example beamforming.

FIG. 2 illustrates example beamforming. In the example of FIG. 2, each network node 210 (which may be a DN 160 or a CN 170) may include a sector 220. Each sector 220 may include an array of beamforming antennas. To aim sector 220 for transmission, a processor in a network node 210 may instruct a beamformer in the network node 210 to selectively weight or delay signals transmitted by the antennas of the sector 220 to aim main lobe 240 of the transmission in a desired direction. In addition to transmitting in the direction of main lobe 240, sector 220 may also transmit weaker signals in the directions of side lobes 260 and 280, which may interfere with other transmissions, as shown by the dotted directional lines in FIG. 2. To aim sector 220 for reception, the processor in the network node 210 may weigh, delay, or sum signals received by the antennas of sector 220.

In particular embodiments, a network node 210 of a multi-hop wireless network 100 may broadcast a beamforming scan to determine topology information of deployed network nodes in the multi-hop wireless network 100 before igniting the deployed network nodes. The network node 210 may comprise a plurality of arrays of beamforming antennae that may be each operable to support a wireless connection between the network node 210 and another network node 210 of the multi-hop wireless network 100. A network node 210 may need to be ignited. Ignition for a particular network node 210 may occur when an antenna array of the particular network node 210 establishes a wireless connection with another antenna array of a different network node 210. In particular embodiments, network ignition may require information and data including settings regarding beamforming weights for one or more antenna arrays in each of the network nodes 210. The information and data may also include Global Positioning System (GPS) data, orientations of the network nodes 210 and other information that may be useful in igniting the nodes. Collecting such information and data without errors may be an expensive operation because collecting such information and data may require human effort. The network may determine such information and data by having a scanning phase before the igniting phase.

More information on igniting network nodes in a multi-hop wireless network may be found in U.S. patent application Ser. No. 15/392,882, filed 28 Dec. 2016, which is incorporated by reference.

When a network node 210 of the multi-hop wireless network 100 is powered on, the network node 210 may acquire location, frequency, and timing and phase sync information from a global positioning system (GPS) module connected to the network node 210. The network node 210 may determine whether the network node 210 has a connection to a central controller 140 of the multi-hop wireless network 100 through an in-band link. In response to the determination, the network node 210 may wait to be configured by the central controller 140 as an "initiator" or a "responder" in the ignition procedure. If the network node 210 does not have a connection to the central controller 140, the network node 210 may automatically configure itself as a responder. A network node 210 may begin a broadcast beamforming topology scanning when the network node 210 is configured as an initiator by the central controller 140. In particular embodiments, the network node 210 may begin the broadcast beamforming topology scanning on receiving an explicit triggering message from the central controller 140.

An initiator network node 210 may perform a topology scanning for a predetermined number (e.g., 4) of scan cycles to resolve message collisions and/or interferences. A scan cycle may comprise n beamforming windows, where n may correspond to a predefined number of beams (e.g., 31). Each beam may correspond to a predetermined configuration of beamforming weights of an array of beamforming antennae. A beamforming window may comprise n beamforming frames. Each beamforming frame may comprise a plurality of transmission slots and a plurality of reception slots. In i-th beamforming window of a cycle, the initiator network node 210 may broadcast a scan-request message using transmission beam i at each beamforming frame j, where j= {0, . . . , n−1}. The destination address of the scan-request message may be set to the broadcast address. On receiving the scan-request message at j-th beamforming frame of the i-th beamforming window of a cycle, a responder network node 210, not having a connection to the central controller 140, may prepare a scan-response message comprising a media access control (MAC) address of the responder network node 210, GPS location information acquired from the connected GPS module, and a list of addresses for one or more collocated (or, wired connected) network nodes in a site. When the responder network node 210 receives the scan-request messages at more than one beamforming frames in the beamforming window i, the responder network node 210 may choose a beamforming frame j with a highest reception signal strength. The responder network node 210 may send the prepared scan-response message back to the initiator network node 210 in a beamforming window i+N, where N is a predetermined constant number. The responder network node 210 may transmit the scan-response message using transmission beam j at a randomly selected beamforming frame k of beamforming window i+N. The responder network node 210 may select the beamforming frame k for the transmission randomly to reduce a possibility of collisions with any other potentially existing responder network nodes.

When the initiator network node 210 successfully receives the scan-response message from the responder network node 210 at the beamforming frame k of the beamforming window i+N, the initiator network node 210 may prepare an acknowledgement message and transmits the acknowledgement message using the transmission beam i. Once a scan-response message for a scan-request message is successfully acknowledged, the responder network node 210 may not respond to any scan-request message from the initiator network node 210 in beamforming window i of any following cycles to reduce changes of collisions. At the end of scanning procedure, the initiator network node 210 may ignite the scanned responder network nodes. After being ignited, a responder network node 210 may, as being connected to the central controller 140, become an initiator network node 210 and perform a broadcast beamforming scan to scan network nodes that have not been scanned yet. Although this disclosure describes topology scanning in a multi-hop wireless network in a particular manner, this disclosure contemplates topology scanning in a multi-hop wireless network in any suitable manner.

In particular embodiments, A first network node 210 of a multi-hop wireless network 100 may be connected to a central controller 140 of the multi-hop wireless network 100. Each network node 210 of the multi-hop wireless network 100 may comprise a plurality of arrays of beamforming antennae that may be each operable to support a wireless connection between the network node 210 and another network node 210 of the multi-hop wireless network 100. Beamforming weights of an array of beamforming antennae may be set to one of predetermined number of configurations. A particular configuration of beamforming weights may be referred to as a beam i, where i={0, ..., n−1}, where n is the predetermined number of configurations for beamforming weights. Although this disclosure describes a particular network node of a multi-hop wireless network, this disclosure contemplates any suitable network node of a multi-hop wireless network.

Figure 3:
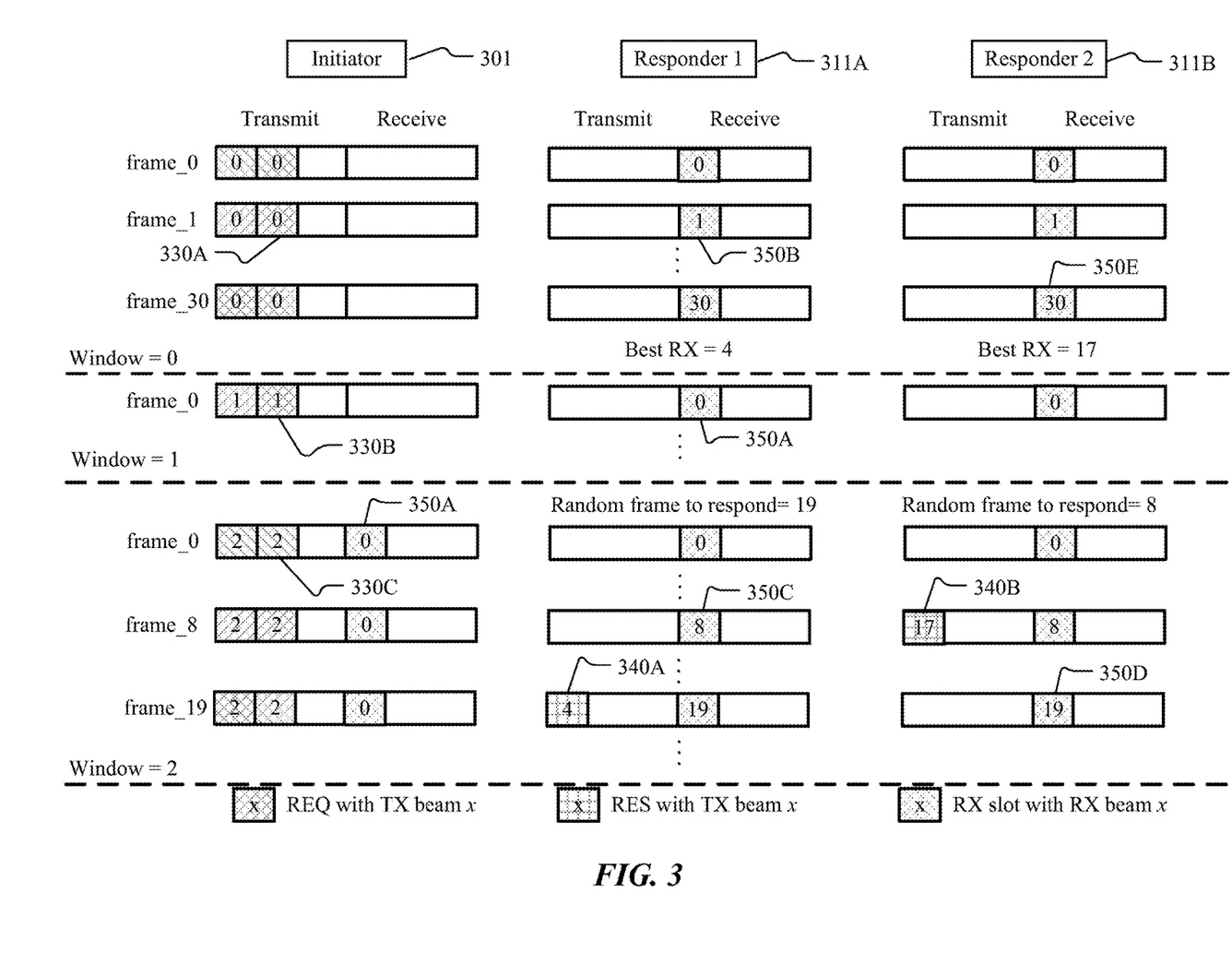
FIG. 3 illustrates example message exchanges for a topology scanning.

In particular embodiments, the first network node 210 may start a topology scanning when the first network node 210 is configured as an initiator by the central controller 140. In particular embodiments, the first network node 210 may start a topology scanning when the first network node 210 receives an explicit triggering message from the central controller 140. The first network node 210 may perform the topology scanning for a predetermined number of scan cycles. Each scan cycle may comprise n beamforming windows, where n may correspond to a predefined number of beams. Each beam may correspond to a predetermined configuration of beamforming weights of an array of beamforming antennae. A beamforming window may comprise n beamforming frames. A beamforming frame may comprise a plurality of transmission slots and a plurality of reception slots. FIG. 3 illustrates example message exchanges for a topology scanning. As an example and not by way of limitation, illustrated in FIG. 3, a network node 301 may be configured as an initiator by a central controller 140 of the multi-hop wireless network 100. Then the initiator network node 301 may start a topology scanning. As another example and not by way of limitation, the initiator network node 301 may receive a message from the central controller 140 instructing the initiator network node 301 to start a topology scanning. Although this disclosure describes triggering a topology scanning in a particular manner, this disclosure contemplates triggering a topology scanning in any suitable manner.

In particular embodiments, a second network node 210 of the multi-hop wireless network 100 may acquire geo-location information, frequency and timing information from a GPS module connected to the second network node 210. The second network node 210 may be in a responder mode because the second network node 210 may be unconnected to the central controller 140 of the multi-hop wireless network 100. The second network node 210 may synchronize to beamforming cycles based on the acquired frequency and timing information. The second node may listen to signals using reception beam j at beamforming frame j of each beamforming window while being in the responder mode. As an example and not by way of limitation, illustrated in FIG. 3, network nodes 311A and 311B may acquire respective GPS coordinates, and frequency and timing information from connected GPS module upon being powered-on. Because the network nodes 311A and 311B do not have connectivity to the central controller 140 of the multi-hop wireless network 100, both network node 311A and network node 311B may enter into the responder mode and start acting as responder network nodes. In the responder mode, the first responder network node 311A and the second responder network node 311B may listen to signals using reception beam j at beamforming frame j of each beamforming window. As illustrated in FIG. 3, the first responder network node 311A and the second responder network node 311B listen to signals using reception beam 0 350A at beamforming frame 0 of beamforming windows 0, 1, and 2. At beamforming frame 1 of beamforming window 0, the first responder network node 311A and the second responder network node 311B listen to signals using reception beam 1 350B. Likewise, at beamforming frame 30 of beamforming window 0, the first responder network node 311A and the second responder network node 311B listen to signals using reception beam 30 350E. At beamforming frame 8 of beamforming window 2, the first responder network node 311A and the second responder network node 311B listen to signals using reception beam 8 350C. At beamforming frame 19 of beamforming window 2, the first responder network node 311A and the second responder network node 311B listen to signals using reception beam 19 350D. Although this disclosure describes listening to signals of a network node in the responder mode in a particular manner, this disclosure contemplates listening to signals of a network node in the responder mode in any suitable manner.

In particular embodiments, the first network node 210 may transmit one or more scan-request messages using a transmission beam i at each beamforming frame of beamforming window i in each scan cycle during the topology scanning. At a beamforming frame j of beamforming window i, the first network node 210, in the initiator mode, may transmit more than one scan-request messages using a transmission beam i at more than one slots of the beamforming frame j. Each of the one or more scan-request messages may comprise a broadcast address as a scan-request destination address and a first identifier identifying the first network node 210 as a scan-request source address. In particular embodiments, the first identifier may be a media access control (MAC) address associated with the first network node 210. In particular embodiments, the broadcast address may be a broadcast MAC address. As an example and not by way of limitation, illustrated in FIG. 3, the initiator network node 301 may send two scan-request messages 330 at each beamforming frame. During beamforming window 0, the initiator network node 301 may send scan-request messages using transmission beam 0 330A. During beamforming window 1, the initiator network node 301 may send scan-request messages using transmission beam 1 330B. During beamforming window 2, the initiator network node 301 may send scan-request messages using transmission beam 2 330C. Although this disclosure describes transmitting scan-request messages in a particular manner, this disclosure contemplates transmitting scan-request messages in any suitable manner.

In particular embodiments, the second network node 210 may receive a scan-request message from the first network node 210 at beamforming frame j of beamforming window i. The scan-request message may be sent using transmission beam i. The scan-request message may comprise a broadcast address as a scan-request destination address. The scan-request message may comprise the first identifier identifying the first network node 210 as a scan-request source address. In particular embodiments, the second network node 210 may receive more than one scan-request messages from the first network node 210 at more than one beamforming frames of the beamforming window i. Then, the second network node 210 may select the beamforming frame j associated with a highest reception signal strength. Because the second network node 210 received the scan-request message with the highest signal strength while the second network node 210 was using reception beam j, a message sent by the second network node 210 using transmission beam j may be received at the highest signal strength at the first network node 210 compared to other messages sent using other transmission beams. The second network node 210 may send a scan-response message using a transmission beam j at beamforming frame k of beamforming window i+N, where N is a predetermined constant number. The scan-response message may comprise the first identifier as a scan-response destination address, a second identifier identifying the second network node 210 as a scan-response source address, an indication that transmission beam j is used for transmitting the message, geo-location information associated with the second network node 210, and one or more identifiers of one or more network nodes 210 collocated with the second network node 210. The second identifier may be a MAC address associated with the second network node 210. The geo-location information may comprise global positioning system (GPS) coordinates. The beamforming frame k may be a randomly selected beamforming frame among n beamforming frames in beamforming window i+N. The second network node 210 may send the scan-response message at a randomly selected beamforming frame k to reduce a probability of collisions. As an example and not by way of limitation, illustrated in FIG. 3, the first responder network node 311A may receive one or more scan-request messages from the initiator network node 301 in beamforming window 0. Among the received scan-request messages, the scan-request message received using reception beam 4 may be associated with the highest reception signal strength. In beamforming window 2 (i.e., the N is 2 in this example), the first responder network node 311A may randomly select beamforming frame 19 for a response and send a scan-response message using transmission beam 4. As another example and not by way of limitation, illustrated in FIG. 3, the second responder network node 311B may receive one or more scan-request messages from the initiator network node 301 in beamforming window 0. Among the received scan-request messages, the scan-request message received using reception beam 17 may be associated with the highest reception signal strength. In beamforming window 2, the second responder network node 311B may randomly select beamforming frame 8 for a response and send a scan-response message using transmission beam 17. Though the first responder network node 311A and the second responder network node 311B received scan-request in beamforming window 0, the scan-response messages from the first responder network node 311A and the second responder network node 311B avoid colliding with each other because the first responder network node 311A and the second responder network node 311B select frames to respond randomly. Although this disclosure describes transmitting a scan-response message in response to receiving a scan-request message in a particular manner, this disclosure contemplates transmitting a scan-response message in response to receiving a scan-request message in any suitable manner.

In particular embodiments, the first network node 210 may listen to signals using a reception beam i at each beamforming frame of beamforming window i+N in each scan cycle, where N may be a predetermined constant number. The first network node 210 may receive a scan-response message sent using a transmission beam j by a second network node 210. The scan-response message received in beamforming window i+N may be a response to one of the one or more scan-request messages sent in beamforming window i. Any network node 210 that received the scan-request messages in beamforming window i may be supposed to transmit a scan-response message in beamforming window i+N. Because the scan-request messages sent using transmission beam i have been successfully received by the second network node 210 with reception beam j, the scan-response message sent by the second network node 210 using transmission beam j may be successfully received by the first network node 210 using reception beam i. The second network node 210 may be unconnected to the central controller 140. A network node 210 may be supposed to send a scan-response message only when the network node 210 is in the responder mode (i.e., not connected to the central controller). As an example and not by way of limitation, illustrated in FIG. 3, the initiator network node 301 may listen to signals using reception beam i in beamforming window 2. The initiator network node 301 may receive a scan-response message with transmission beam 17 340B from the second responder network node 311B at beamforming frame 8 of beamforming window 2. The initiator network node 301 may also receive a scan-response message with transmission beam 4 340A from the first responder network node 311A. Although this disclosure describes receiving scan-response messages in a particular manner, this disclosure contemplates receiving scan-response messages in any suitable manner.

In particular embodiments, the first network node 210 may send a scan-acknowledgement message to the second network node 210 using transmission beam i. In particular embodiments, the first network node 210 may send a scan-acknowledgement message to the second network node 210 at beamforming frame k of the beamforming window i+N, where beamforming frame k is the beamforming frame at which the first network node 210 received the scan-response message from the second network node 210. The first network node 210 may use a slot available after transmitting scan-request messages using transmission beam i+N for transmitting the scan-acknowledgement message. The second network node 210 may listen to signals using reception beam j in the remaining slots of the beamforming frame k after transmitting a scan-response message using transmission beam j. As an example and not by way of limitation, continuing with a prior example illustrated in FIG. 3, the initiator network node 301 may transmit a scan-acknowledgement message to the second responder network node 311B using transmission beam 0 at beamforming frame 8 of beamforming window 2. The second responder network node 311B may listen to signals using reception beam 17 in the remaining slots of beamforming frame 8 after transmitting the scan-response message using transmission beam 17 340B. The initiator network node 301 may transmit a scan-acknowledgement message to the first responder network node 311A using transmission beam 0 at beamforming frame 19 of beamforming window 2. The first responder network node 311A may listen to signals using reception beam 4 in the remaining slots of beamforming frame 19 after transmitting the scan-response message using transmission beam 4 340A. In particular embodiments, the first network node 210 may send a scan-acknowledgement message to the second network node 210 at a first beamforming frame j after receiving a scan-response message from the second network node 210. As an example and not by way of limitation, continuing with a prior example illustrated in FIG. 3, the initiator network node 301 may send a scan-acknowledgement message using transmission beam 0 to the second responder network node 311B at beamforming frame 17 of beamforming window 2. The second responder network node 311B may listen to signals using reception beam 17 at beamforming frame 17 of beamforming window 2. As another example and not by way of limitation, continuing with a prior example illustrated in FIG. 3, the initiator network node 301 may send a scan-acknowledgement message using transmission beam 0 to the first responder network node 311A at beamforming frame 4 of beamforming window 3 because the initiator network node 301 received the scan-response message using transmission beam 4 340A at beamforming frame 19 of beamforming window 2. Although this disclosure describes transmitting scan-acknowledgement messages in a particular manner, this disclosure contemplates transmitting scan-acknowledgement messages in any suitable manner.

In particular embodiments, the first network node 210 may store information associated with the second network node 210 upon receiving a scan-response message from the second network node 210. The information may comprise an indication that beam i is a beam for communications at the first network node 210, an indication that beam j is a beam for communications at the second network node 210, the second identifier, the geo-location information associated with the second network node 210, and the identifiers of the network nodes collocated with the second network node 210. The stored information may be used for igniting the second network node 210 at the end of the topology scanning. As an example and not by way of limitation, continuing with a prior example illustrated in FIG. 3, the initiator network node 301 may store information associated with the first responder network node 311A upon receiving the scan-response message with transmission beam 4 340A at beamforming frame 19 of beamforming window 2. The scan-response message 340A sent by the first responder network node 311A using transmission beam 4 may comprise a MAC address associated with the initiator network node 301 as the destination address of the message, a MAC address associated with the first responder network node 311A as the source address of the message, an indication that the message is sent using transmission beam 4, GPS coordinates associated with the first responder network node 311A, and zero or more MAC addresses associated with zero or more network nodes collocated with the first responder network node 311A. The information may comprise an indication that beam 0 is a beam for communications at the initiator network node 201, an indication that beam 4 is a beam for communications at the first responder network node 311A, GPS coordinates associated with the first responder network node 311A, a MAC address associated with the first responder network node 311A, and zero or more MAC addresses associated with zero or more network nodes collocated with the first responder network node 311A. Although this disclosure describes storing information associated with a responder network node in a particular manner, this disclosure contemplates storing information associated with a responder network node in any suitable manner.

In particular embodiments, the second network node 210 may receive a scan-acknowledgement message from the first network node 210. The second network node 210 may store information associated with the first network node 210. The second network node 210 may acquire such information from the received scan-request message or the scan-acknowledgement message from the first network node 210. The stored information may comprise an indication that beam i is a beam for communications at the first network node 210, and an indication that beam j is a beam for communications at the second network node 210, and the first identifier identifying the first network node 210. After storing information associated with the first network node 210, the second computing device may ignore any scan-request message from the first network node 210 received in beamforming window i in any following beamforming cycle. As an example and not by way of limitation, continuing with a prior example illustrated in FIG. 3, the first responder network node 311A may receive a scan-acknowledgement message from the initiator network node 301 after sending the scan-response message 340A to the initiator network node 301. The scan-acknowledgement message may confirm that the initiator network node 301 has successfully received the scan-response message 340A. The first responder network node 311A may store information associated with the initiator network node 301. The information may comprise an indication that beam 0 is a beam for communications at the initiator network node 301, an indication that beam 4 is a beam for communications at the first responder network node 311A, and a MAC address of the initiator network node 301. Although this disclosure describes storing information associated with an initiator network node in a particular manner, this disclosure contemplates storing information associated with an initiator network node in any suitable manner.

In particular embodiments, the first network node 210 may send a network-ignition-request message to the second network node 210 at the end of the topology scanning. The network-ignition-request message may cause the second network node 210 to be ignited. Once ignited, the second network node 210 may have one or more communication links with the first network node 210 and have one or more communication paths to the central controller 140. As being connected to the central controller 140, the second network node 210 may become an initiator network node and perform a topology scanning. Although this disclosure describes igniting a network node that was scanned through a topology scanning in a particular manner, this disclosure contemplates igniting a network node that was scanned through a topology scanning in any suitable manner.

In particular embodiments, a second network node 210 of the multi-hop wireless network 100 may not be connected to a GPS module. In such case, the second network node 210 may acquire frequency and timing information from the first received scan-request message from a first network node 210. The scan-request message may comprise the frequency and timing information. If the second network node 210 of the multi-hop wireless network 100 is not connected to a GPS module, the scan-response messages from the second network node 210 may not include geo-location information associated with the second network node 210. Although this disclosure describes a second network node not being connected to a GPS module in a particular manner, this disclosure contemplates a second network node not being connected to a GPS module in any suitable manner.

Figure 4:
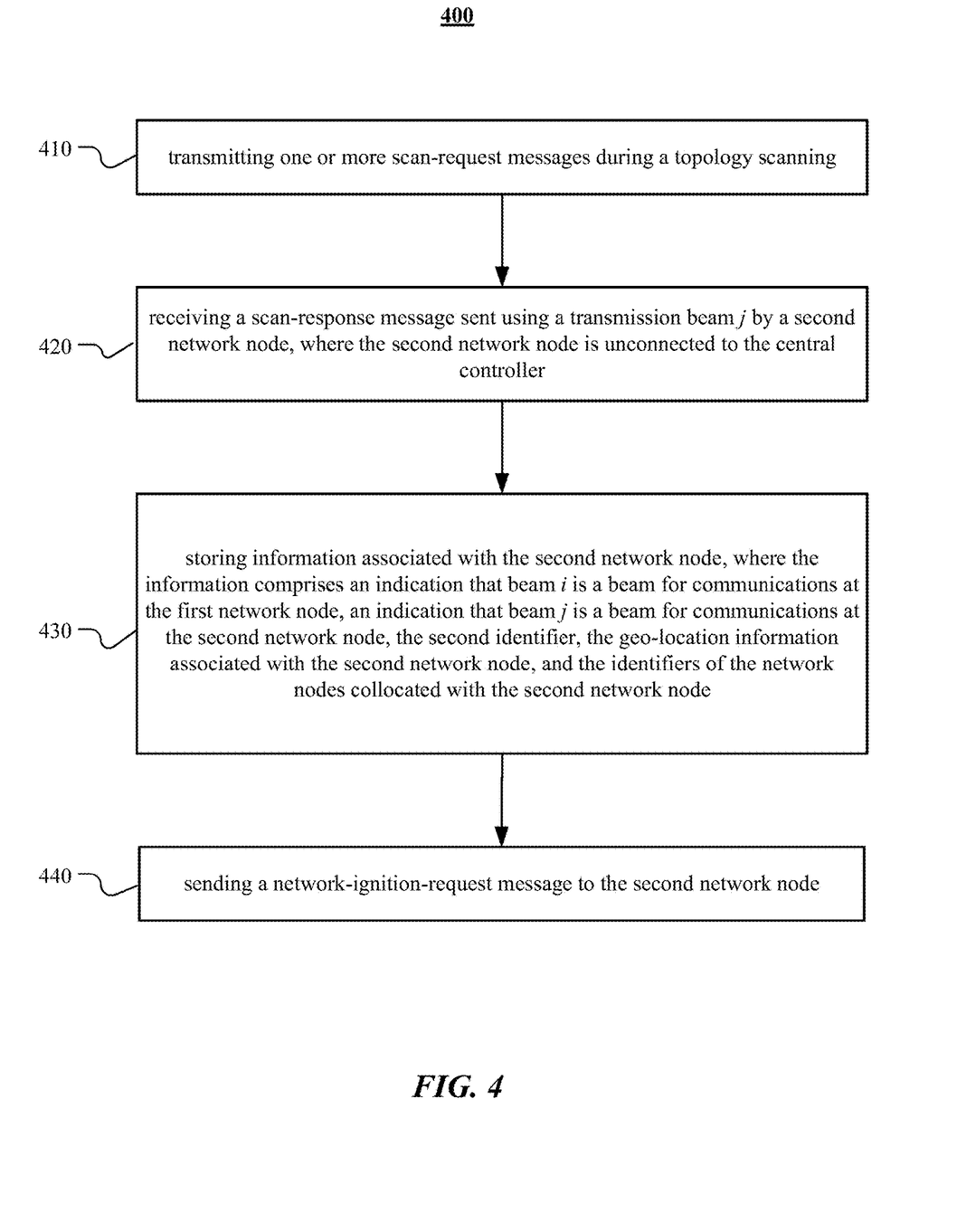
FIG. 4 illustrates an example method for a topology scanning in a multi-hop wireless network.

FIG. 4 illustrates an example method 400 for a topology scanning in a multi-hop wireless network. The method may begin at step 410, where a first network node 210 of a multi-hop wireless network 100 may transmit one or more scan-request messages during a topology scanning, where the topology scanning is performed for a predetermined number of scan cycles, where each scan cycle comprises n beamforming windows, where n corresponds to a predefined number of beams, where each beam corresponds to a predetermined configuration of beamforming weights of an array of beamforming antennae, where the first network node 210 is connected to a central controller 140 of the multi-hop wireless network 100, where the one or more scan-request messages are transmitted using a transmission beam i, and where each of the one or more scan-request messages comprises a broadcast address as a scan-request destination address and a first identifier identifying the first network node as a scan-request source address. At step 420, the first network node 210 may receive a scan-response message sent using a transmission beam j by a second network node 210, where the second network node 210 is unconnected to the central controller 140, and where the scan-response message comprises the first identifier as a scan-response destination address, a second identifier identifying the second network node as a scan-response source address, geo-location information associated with the second network node, and one or more identifiers of one or more network nodes collocated with the second network node. At step 430, The first network node 210 may store information associated with the second network node 210, where the information comprises an indication that beam i is a beam for communications at the first network node 210, an indication that beam j is a beam for communications at the second network node 210, the second identifier, the geo-location information associated with the second network node 210, and the identifiers of the network nodes collocated with the second network node 210. At step 440, the first network node 210 may send a network-ignition-request message to the second network node 210. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for a topology scanning in a multi-hop wireless network including the particular steps of the method of FIG. 4, this disclosure contemplates any suitable method for a topology scanning in a multi-hop wireless network including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
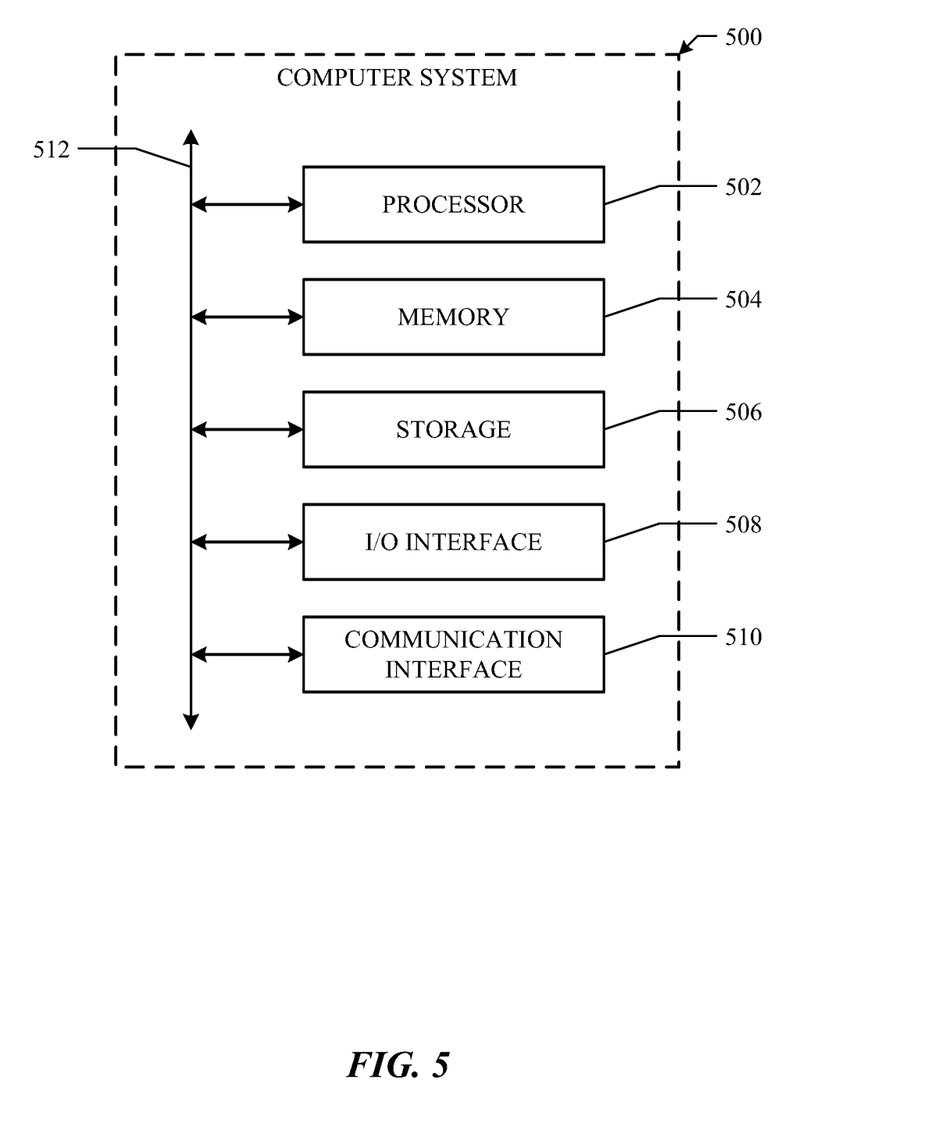
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by the first network node of a multi-hop wireless network, transmitting one or more scan-request messages during a topology scanning, wherein:
        the topology scanning is performed for a particular number of scan cycles;
        each scan cycle comprises n beamforming windows;
        n corresponds to a predefined number of beams;
        each beam corresponds to a predetermined configuration of beamforming weights of an array of beamforming antennae;
        the first network node is connected to a central controller of the multi-hop wireless network;
        the one or more scan-request messages are transmitted using a transmission beam i; and
        each of the one or more scan-request messages comprises:
            a broadcast address as a scan-request destination address; and
            a first identifier identifying the first network node as a scan-request source address;
    by the first network node, receiving a scan-response message sent using a transmission beam j by a second network node, wherein:
        the second network node is unconnected to the central controller; and
        the scan-response message comprises:
            the first identifier as a scan-response destination address;
            a second identifier identifying the second network node as a scan-response source address; and
            one or more identifiers of one or more network nodes collocated with the second network node;
    by the first network node, storing information associated with the second network node, wherein the information comprises:
        an indication that beam i is a beam for communications at the first network node;
        an indication that beam j is a beam for communications at the second network node;
        the second identifier; and
        the identifiers of the network nodes collocated with the second network node; and
    by the first network node, sending a network-ignition-request message to the second network node.

2. The method of claim 1, wherein the topology scanning is triggered when the first network node is configured as an initiator by the central controller.

3. The method of claim 1, wherein the topology scanning is triggered when the first network node receives an explicit triggering message from the central controller.

4. The method of claim 1, wherein each network node of the multi-hop wireless network comprises a plurality of arrays of beamforming antennae that are each operable to support a wireless connection between the network node and another network node of the multi-hop wireless network.

5. The method of claim 1, wherein a beamforming window comprises n beamforming frames, and wherein a beamforming frame comprises a plurality of transmission slots and a plurality of reception slots.

6. The method of claim 5, wherein the first network node transmits a scan-request message using the transmission beam i at each beamforming frame of beamforming window i in each scan cycle.

7. The method of claim 6, wherein the first network node listens to signals using a reception beam i at each beamforming frame of beamforming window i+N in each scan cycle, wherein N is a predetermined constant number, and wherein the scan-response message received in beamforming window i+N is a response to one of the one or more scan-request messages sent in beamforming window i.

8. The method of claim 1, wherein the first identifier is a media access control (MAC) address associated with the first network node.

9. The method of claim 1, wherein the second identifier is a MAC address associated with the second network node.

10. The method of claim 1, wherein the scan-response message further comprises geo-location information associated with the second network node, and wherein the geo-location information comprises global positioning system (GPS) coordinates.

11. The method of claim 5, further comprising sending a scan-acknowledgement message to the second network node using transmission beam i.

12. A method comprising:
by a second network node of a multi-hop wireless network, acquiring, from a GPS module connected to the second network node, geo-location information, frequency and timing information, wherein:
the second network node is in a responder mode because the second network node is unconnected to a central controller of the multi-hop wireless network;
the second network node synchronizes to beamforming cycles based on the acquired frequency and timing information;
a beamforming cycle comprises n beamforming windows;
n corresponds to a predefined number of beams;
each beam corresponds to a predetermined configuration of beamforming weights of an array of beamforming antennae;
a beamforming window comprises n beamforming frames; and
the second node, while being in the responder mode, listens to signals using reception beam j at beamforming frame j of each beamforming window;
by the second network node, receiving, at beamforming frame j of beamforming window i, from a first network node, a scan-request message comprising a broadcast address as a scan-request destination address; and
by the second network node, sending, at a randomly selected beamforming frame of beamforming window i+N, a scan-response message using a transmission beam j, wherein N is a predetermined constant number.

13. The method of claim 12, wherein, if the second network node receives a plurality of scan-request messages at more than one beamforming frames of the beamforming window i, the beamforming frame j is a beamforming frame associated with a highest reception signal strength.

14. The method of claim 12, wherein the second network node sends the scan-response message at a randomly selected beamforming frame to reduce a probability of collisions.

15. The method of claim 12, further comprising:
receiving a scan-acknowledgement message from the first network node; and
storing information associated with the first network node, wherein the information comprises:
an indication that beam i is a beam for communications at the first network node; and
an indication that beam j is a beam for communications at the second network node.

16. The method of claim 15, wherein the second computing device ignores any scan-request message from the first network node received in beamforming window i of any following beamforming cycle.

17. A first network node comprising: one or more processors; and a non-transitory memory coupled to the processors comprising instructions executable by the processors, the processors operable when executing the instructions to:
transmit one or more scan-request messages during a topology scanning, wherein:
the topology scanning is performed for a particular number of scan cycles;
each scan cycle comprises n beamforming windows;
n corresponds to a predefined number of beams;
each beam corresponds to a predetermined configuration of beamforming weights of an array of beamforming antennae;
the first network node is connected to a central controller of the multi-hop wireless network;
the one or more scan-request messages are transmitted using a transmission beam i; and
each of the one or more scan-request messages comprises:
a broadcast address as a scan-request destination address; and
a first identifier identifying the first network node as a scan-request source address;
receive a scan-response message sent using a transmission beam j by a second network node, wherein:
the second network node is unconnected to the central controller; and
the scan-response message comprises:
the first identifier as a scan-response destination address;
a second identifier identifying the second network node as a scan-response source address; and
one or more identifiers of one or more network nodes collocated with the second network node;
store information associated with the second network node, wherein the information comprises:
an indication that beam i is a beam for communications at the first network node;
an indication that beam j is a beam for communications at the second network node;
the second identifier; and
the identifiers of the network nodes collocated with the second network node; and
send a network-ignition-request message to the second network node.

18. The first network node of claim 17, wherein the topology scanning is triggered when the first network node is configured as an initiator by the central controller.

19. The first network node of claim 17, wherein the topology scanning is triggered when the first network node receives an explicit triggering message from the central controller.

20. The first network node of claim 17, wherein each network node of the multi-hop wireless network comprises a plurality of arrays of beamforming antennae that are each operable to support a wireless connection between the network node and another network node of the multi-hop wireless network.

* * * * *